United States Patent
Roosen

(10) Patent No.: US 6,497,414 B1
(45) Date of Patent: Dec. 24, 2002

(54) SEAL FOR A CLOSURE AND A CLOSURE INCORPORATING THE SEAL

(75) Inventor: Dirk Roosen, Tienen (BE)

(73) Assignee: Tyco Electronics Raychem N.V., Kessel-Lo (BE)

( * ) Notice: Subject to any disclaimer, the term of this patent is extended or adjusted under 35 U.S.C. 154(b) by 0 days.

(21) Appl. No.: 09/830,143

(22) PCT Filed: Sep. 30, 1999

(86) PCT No.: PCT/GB99/03253

§ 371 (c)(1),
(2), (4) Date: Apr. 20, 2001

(87) PCT Pub. No.: WO00/25402

PCT Pub. Date: May 4, 2000

(30) Foreign Application Priority Data

Oct. 23, 1998 (GB) .............................................. 9823138
Aug. 28, 1999 (GB) .............................................. 9920342

(51) Int. Cl.$^7$ .......................... F16L 17/00; F16L 21/05; F16L 17/025; E04B 1/682
(52) U.S. Cl. ....................... 277/314; 277/316; 277/603; 277/626; 277/627; 277/650; 277/904; 277/906
(58) Field of Search ................................. 277/314, 316, 277/603, 626, 627, 644, 650, 904, 906

(56) References Cited

U.S. PATENT DOCUMENTS

| 3,095,619 A | * | 7/1963 | Peterson ..................... 277/316 |
|---|---|---|---|
| 4,095,044 A | | 6/1978 | Horsma et al. ............. 174/138 |
| 4,693,767 A | | 9/1987 | Grzanna et al. .............. 156/49 |
| 4,804,020 A | * | 2/1989 | Bartholomew .............. 138/111 |
| 5,775,702 A | * | 7/1998 | Laeremans et al. ......... 174/151 |
| 5,776,277 A | | 7/1998 | Wambeke ................... 156/158 |
| 6,233,779 B1 | * | 5/2001 | Nelson, Sr. ................ 15/250.4 |

FOREIGN PATENT DOCUMENTS

| GB | 2241386 | 8/1991 |
|---|---|---|
| WO | WO 93/03527 | 2/1993 |

OTHER PUBLICATIONS

Copy of International Search Report.

Copy of International Preliminary Examination Report.

* cited by examiner

*Primary Examiner*—Anthony Knight
*Assistant Examiner*—Michael J. Kyle
(74) *Attorney, Agent, or Firm*—Myers Bigel Sibley & Sajovec

(57) ABSTRACT

Articles and methods are provided for sealing a closure having an opening through which more than one elongate article may project. A body is provided having a plurality of axially extending radially projecting ribs defining, between circumferentially adjacent pairs thereof, locations for receiving one or more of the elongate articles. The body includes longitudinally adjacent parts of resilient material and sealant material.

33 Claims, 5 Drawing Sheets

SEAL FOR A CLOSURE AND A CLOSURE INCORPORATING THE SEAL

RELATED APPLICATIONS

The present application is a National Phase application of PCT/GB99/03253 filed on Sep. 30, 1999 and published in English, which claims priority from Applications GB 9823138.4 filed on Oct. 23, 1998 and GB 9920342.4 filed on Aug. 28, 1999.

The present invention relates generally to a seal for a closure, and more specifically to a seal for sealing an aperture in a closure through which more than one elongate article may extend. The present invention also relates to closures including such a seal, and to seal parts constituting such a seal.

BACKGROUND OF THE INVENTION

The present invention finds particularly utility as a seal for use in a casing for protecting junctions between elongate articles such as pipes, tubes or cables. As used in this specification the term "cable" will be understood to refer not only to electrically conductive cables, but also to bundles of optical fibres. When it is necessary to make end-to-end or branch connections between elongate articles such as pipes, tubes or cables the junction or splice where such articles are joined is almost always less strong and less resistant to environmental agents than is the article itself. Unless protected from such environmental agents, therefore, the junction between the elongate articles is subject to deterioration over time.

In telecommunication or power transmission systems it is frequently necessary to make splices either to join cables end-to-end or make a branch. The cables and the splices may be located above ground, underground, in conduits or in other environments either inside or outside buildings, but wherever they are located there is always the risk of ingress of environmental agents such as moisture or dust. In addition, underground installations are also subject to pressure, particularly hydrostatic pressure, whilst above ground installations suffer from diurnal thermal variations and other effects such as vibration, the risk of impacts or other disturbing forces.

In order to provide environmental protection for splices in cables or other elongate articles various protective measures are known. Systems utilising an enclosing casing have been found to be particularly valuable, such casings being enclosed containers having a housing for enclosing the cable connections or splices and at least one aperture in the housing wall through which the cable or cables can extend. Naturally, in order to prevent contamination by external agents, it is necessary to form a secure seal between the casing and any cable passing through it.

In some cases the opening has to be large enough to accommodate several cables although often a smaller number, less than the full complement, is used in practice. Such situations provide particular difficulties in forming a good seal because not only the size but also the cross sectional shape of a bundle of cables will vary in dependence on the actual number of cables used.

The Applicant's international patent application WO97/45904 describes such a seal and a casing forming a cable closure in which the space between a cable passing through an opening and the opening itself is occupied with a gel held under pressure by a spring or other resilient means. This device, however, was particularly adapted to be used in circumstances where a single cable passes through each individual opening in the casing, so that the body of gel provided for engagement with the cable surface can be preliminarily shaped approximately to match the surface of the cable. This system works well and effectively, but cannot be immediately applied to casings in which the number of individual cables which may pass out through an opening cannot be determined in advance and for which, for reasons of production economy, it is appropriate to produce a modular casing capable of accommodating a range of cable configurations.

The Applicant's international patent application PCT/GB99/01898 discusses one attempt to accommodate a situation where a plurality of cables pass out through an opening. This is achieved by providing a core or plug body having a plurality of channels and an associated sealant element the shape of which substantially matches that of the opening into which the sealant element is to be fitted such that, when a cable is fitted into one of the channels of the sealant element, the sealant is deformed and can be compressed in such a way as to form a seal between the cable and the opening.

The present invention is directed at substantially the same problem but provides an alternative solution in which, nevertheless, a good seal between an opening and an unspecified number of elongate elements such as cables may be achieved quickly and economically.

The Applicant's U.S. Pat. No. 5,776,277 discloses a sealing device comprising flexible ribs which in use extend at least part around the periphery of each substrate so as to provide a sealing block between the elongate substrates and the housing. Foam blocks minimise any movement of the ribs along the body of the device but have no sealing function. Although this known device functions satisfactorily, it was found that its sealing capabilities could still be improved on.

SUMMARY OF THE INVENTION

According to one aspect of the present invention, therefore, a seal element for a closure having an opening through which more than one elongate article may project comprises a body having a plurality of axially extending radially projecting ribs defining, between circumferentially adjacent pairs thereof, locations for receiving one or more said elongate members, and is according to the present invention characterised in that the body comprises longitudinally adjacent parts of resilient material and sealant material.

In use of the seal element of the present invention elongate elements such as cables can be laid into the locations between circumferentially adjacent pairs of ribs in contact with the sealant material. As will be described in more detail below, a further sealant element may then be wrapped around the sealant part of the seal element and the whole assembly fitted into an opening in a casing. This offers a convenient way in which the elongate elements or cables can be held separate from one another which is advantageous in allowing the sealing pressure of the sealant material to be well transferred between them. A single shape and size of seal element can be made for use with a range of sizes of opening, and is capable of accommodating a range of sizes of cable as well as an unspecified number of cables.

In a preferred embodiment of the invention the said ribs have opposite faces which are substantially parallel, the resilient and sealant parts thereof being substantially flush with one another. It would, of course, be possible for the sealant part of the element to have a different shape from that of the resilient part, and in particular to project radially such as to require deformation as an elongate element is positioned into one of the locations between adjacent ribs.

Preferably the ribs are substantially flat although convex or concavely curved ribs may be utilised in certain circumstances.

Likewise, it is convenient if the opposite faces of the ribs converge radially outwardly. Such convergence is preferably at an extremely acute angle of only a few degrees.

The sealant part of the body is preferably a gel and suitable gel materials are known, for example, from our earlier international patent application WO97/45904.

The resilient part of the seal body may be a natural or synthetic elastomer. A preferred embodiment is formed with five said radially projecting ribs and the material of both the resilient part or parts and the sealant parts or parts is such that it can be severed with a cutting instrument.

The present invention also comprehends an assembly for making a seal between an opening through which one or more elongate articles may project, and the articles themselves, comprising a seal element in the form of a body having a plurality of axially extending radially projecting ribs defining between circumferentially adjacent pairs thereof, locations for receiving one or more said elongate members, the body comprising longitudinally adjacent parts of resilient material and sealant material, at least one retainer or tie strap for retaining the elongate articles in position between respective pairs of ribs, and an elongate strip of sealant material to be wrapped around the elongate articles at an axial location corresponding to that of the part of the body composed of sealant material.

The assembly may further comprise an elongate, substantially rigid reinforcing member positionable alongside an elongate element or in a vacant location between two adjacent ribs in a completed seal. Such a reinforcing member is of particular value in circumstances where there may be fewer cables than the minimum number of locations between ribs which it is convenient to provide. This reinforcing member can then be laid in the vacant location and acts as a reaction member against which the retaining member can act in holding together the elongate elements to retain them in the locations between the ribs.

Preferably an assembly for forming a seal also comprises retainers or tie straps for encircling the elongate elements (and, if provided, the rigid reinforcing member or members) at a position axially spaced from the seal body at each end thereof.

The assembly may, likewise, further include an adhesive strip for encircling the sealant strip and retaining it in position around the said elongate elements and the body of the seal element.

In a practical embodiment there is further provided at least one tension resistant retainer which can be fitted so as to extend circumferentially around the elongate elements and the resilient part of the seal element, acting to hold them together whereby to transfer axial loads from one to the other. Such tension resistant retainers are sometimes known as axial pull tapes and suitable examples will be described hereinafter in more detail. One such suitable tension resistant retainer comprises a strip of malleable material having surface formations such as to grip the said resilient part of the seal element when located circumjacently thereabout.

The present invention also comprehends a method of forming a seal for sealing between an opening and a plurality of elongate elements passing through the opening, comprising the steps of assembling the elongate elements with a seal element comprising a body having a plurality of axially extending radially projecting ribs defining between circumferentially adjacent pairs thereof locations for receiving one or more said elongate members, the body comprising longitudinally adjacent parts of resilient material and sealant material, with each elongate element received in a respective location between two adjacent elongate ribs of the seal element and extending there along, encircling the elongate elements with a retainer to secure them in position in the said locations, severing that part of each rib projecting radially beyond the elongate elements and applying an elongate strip of sealant circumferentially around the assembly in axial juxtaposition with the sealant part of the body to form a surrounding band of sealant the dimensions of which are not less than those of the opening to be sealed.

It is of value to be able to provide a universal seal element having a given number of ribs which may be greater than is always required. The method of the present invention thus includes the step of preparing the seal element by removing one or more ribs to provide a number of locations appropriate for the number of elongate elements to be received in the said locations thereof.

Thus, for example, if the seal element has five ribs, therefore defining five locations between circumferentially adjacent pairs of ribs, and it is only required to locate three cables, two of the ribs may be removed at or adjacent their roots to provide three locations for cables.

In some circumstances it may not be appropriate to position a cable in every location, for example if only two cables are to be utilised, because it is impracticable to cut down a seal element to fewer than three ribs. In such circumstances there may be provided a supplementary element to be received in a location not required for an elongate member around which the retainer member passes to retain the elongate elements in position in the locations.

Alternatively, one of the ribs of at least one part is at both ends provided with axially extending retaining bodies for retaining the elongate articles in their respective locations. This allows a better defined position of the seal element relative to the elongate articles, even when only one rib is used and the other ribs have been cut away.

BRIEF DESCRIPTION OF THE DRAWINGS

Various embodiments of the present invention will now be more particularly described, by way of example, with reference to the accompanying drawings, in which.

DETAILED DESCRIPTION OF THE ILLUSTRATED EMBODIMENTS

Figure 1:
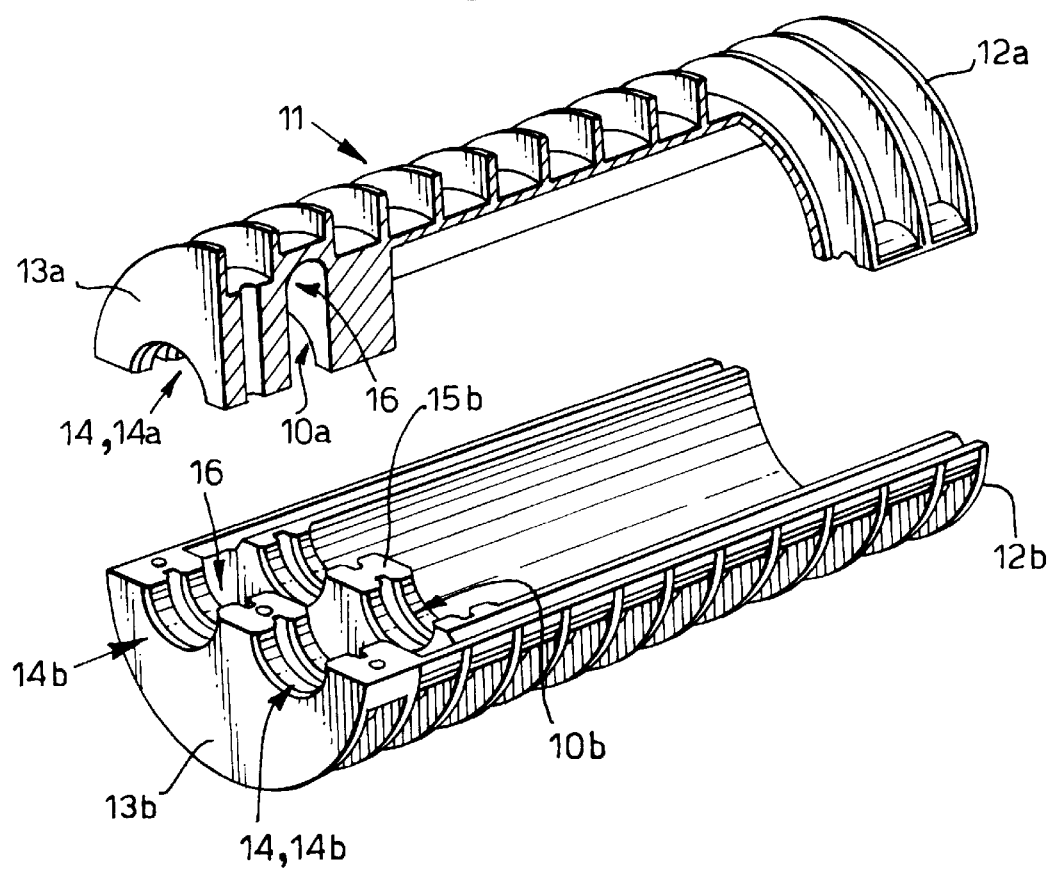
FIG. 1 is a cut away perspective view of a part of a casing within which cable splices may be formed and having an opening within which a seal in accordance with the present invention may be formed.

Referring now to the drawings, FIG. 1 illustrates a closure of the type in relation to which the seal of the present invention may be used. This closure is a cable splice housing generally indicated 11 formed in two separate housing parts 12a, 12b which are approximately semicylindrical and meet along a diametral plane to form an enclosed container. Only one end of the container is shown in FIG. 1, having end walls 13a, 13b in which are formed semicircular recesses 14a, 14b respectively which, when the two casing halves 12a, 12b are fitted together form an opening 14 through which can extend one or a plurality of cables which are spliced in the housing 11.

Secondary walls 15a, 15b with corresponding semicircular recesses 10a, 10b form a second partition spaced from the end walls 13a, 13b and defining therewith a cavity 16.

As mentioned above, a plurality of cables may pass out through each of the openings 14, the precise number of cables differing from time to time in different circumstances.

Figure 2:
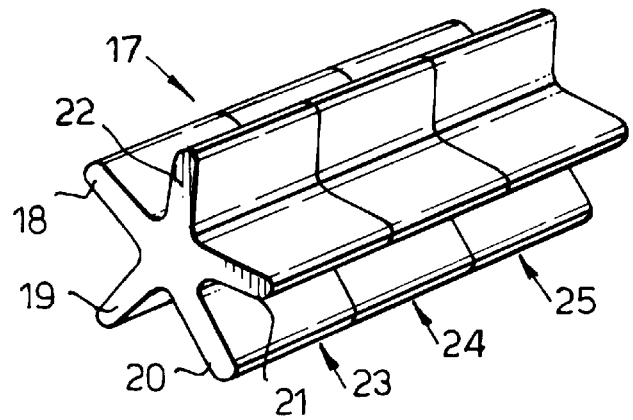
FIG. 2 is a perspective view of one embodiment of a seal element formed as an embodiment of the present invention.

FIG. 2 illustrates a seal element generally indicated 17 forming an embodiment of the invention and which is intended to be used to form the basis of a seal which, in use, will occupy the openings defined by the semicircular recesses 14a, 14b and the corresponding opening defined in the partition wall 15, and which will occupy at least part of the cavity 16. The seal element 17 is an elongate member having a body from which projects a plurality of radial, axially extending ribs individually identified as ribs 18, 19, 20, 21 and 22. In this embodiment five such ribs are provided although it will be appreciated that in other embodiments a different number of ribs may be formed. In the embodiment shown in FIG. 2 the element 17 is of constant cross section throughout but the material of which it is composed comprises individual sections 23, 24, 25 which are longitudinally adjacent and made of different materials. The end sections 23, 25 are made from an elastomer, typically rubber (although a synthetic elastomer may alternatively be used) and the central section 24 is made from a sealant gel of known type, such as that discussed in the applicant's international patent application WO97/45904 referred to above. In some alternative embodiments, the central section 24 has a greater cross section and/or thicker ribs than the end sections 23 and 25, as exemplified in FIG. 2a.

Figure 3:
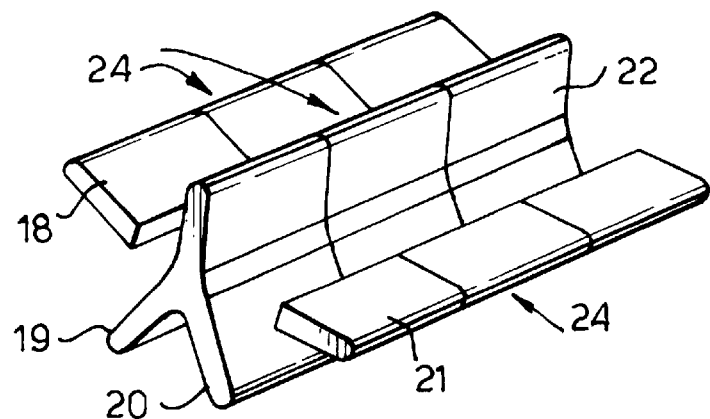
FIG. 3 is a perspective view showing the separation of some of the ribs from the seal element of FIG. 2.

Between circumferentially adjacent pairs of ribs is defined a generally V-shape region which defines a location for one or a plurality of cables to be sealed in the opening where they pass out from a closure such as the closure 11 described in relation to FIG. 1. Should it be required to provide a seal for fewer than five cables an appropriate number of ribs may be separated from the element 17 by cutting, for example, as illustrated in FIG. 3 which shows the ribs 18 and 21 being severed from the body to leave three locations for cables.

Figure 2A:
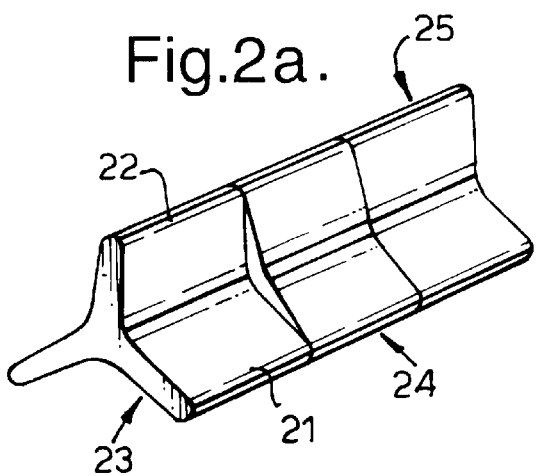
FIG. 2a is a schematic perspective view of part of an alternative embodiment.

It should be mentioned that the element 17 can be produced economically, for example by extrusion, with the longitudinally adjacent sections 23, 24, 25 of different material being bonded to one another during the extrusion process. Alternatively, a separate bonding process may be preferred which would allow the gel section 24 to have a different profile from that of the resilient elastomeric sections 23, 25 and in particular to have a shape which involves the provision of a pad or cushion in a location between two adjacent ribs, as illustrated by way of example in FIG. 2a. The ribs 22 and 21 are illustrated in FIG. 2a with the gel section 24 having a shape such that the included angle between two adjacent surfaces of the ribs 21, 22 is greater in the gel section 24 than in the elastomeric sections 23, 25 so that when a cable is laid in the location defined between two adjacent ribs the gel is deformed and more closely contacts the cable.

Figure 4:
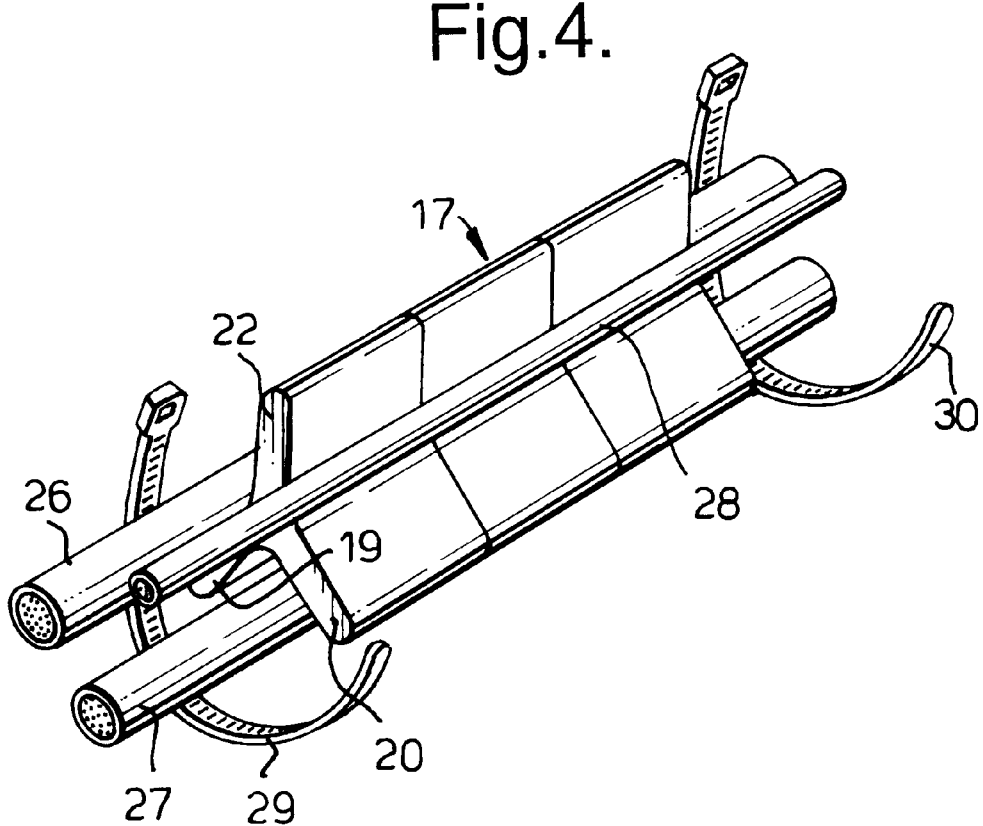
FIG. 4 is a perspective view illustrating a step in the assembly of a seal utilising the seal element of FIG. 2.
Figure 5:
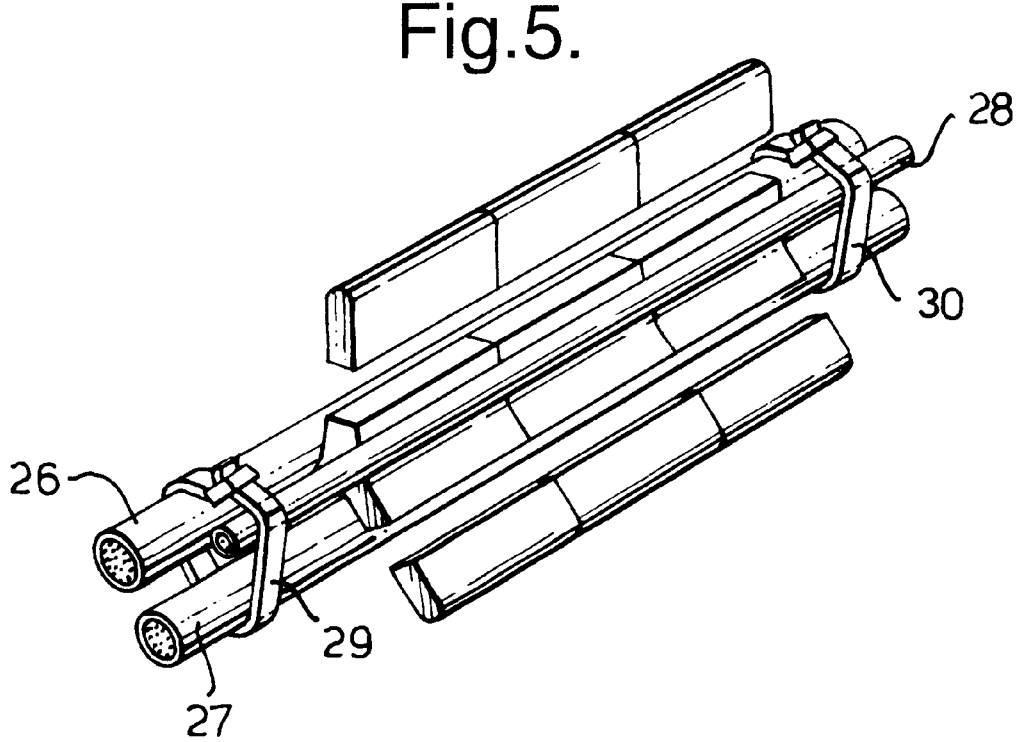
FIG. 5 is a perspective view illustrating a further step in the process of forming a seal according to the invention.

As can be seen in FIGS. 4 and 5, if fewer than three cables are to be sealed in the opening, a subsidiary reinforcing member 28 may be placed in the surplus location. In FIG. 4 two cables 26, 27 are shown placed between ribs 19 and 22, and between ribs 19 and 20 with the reinforcing member 28 being positioned in the location between ribs 20 and 22. The seal element 17 is then retained in position by means of two retainers or tie wraps 29, 30 which are positioned around the cables and the reinforcement member at a position longitudinally spaced from the seal element 17 so that, when the tie wraps are drawn tight as illustrated in FIG. 5 the cables 26, 27 and the reinforcement member 28 are drawn tightly into the included angle between each respective pair of adjacent ribs so that the seal element is held tightly between them.

Figure 6:
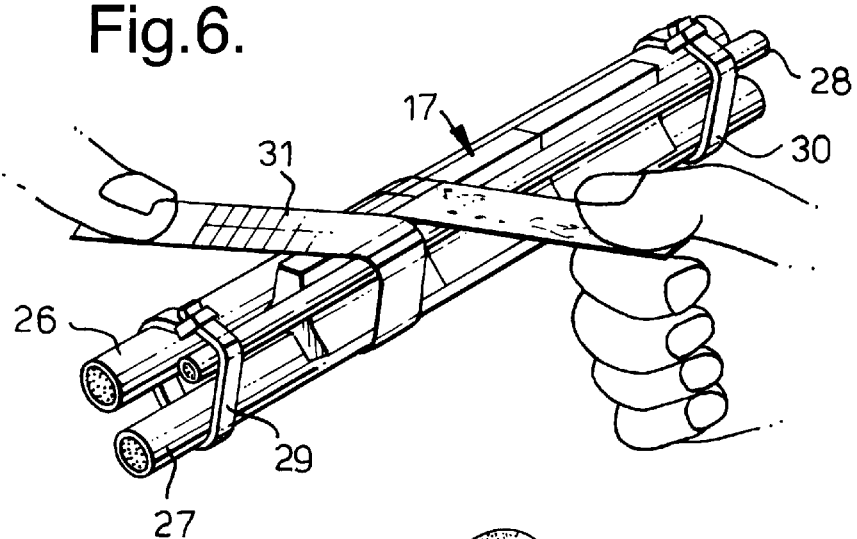
FIG. 6 is a perspective view of a further step in the production of a seal assembly according to the invention.
Figure 7:
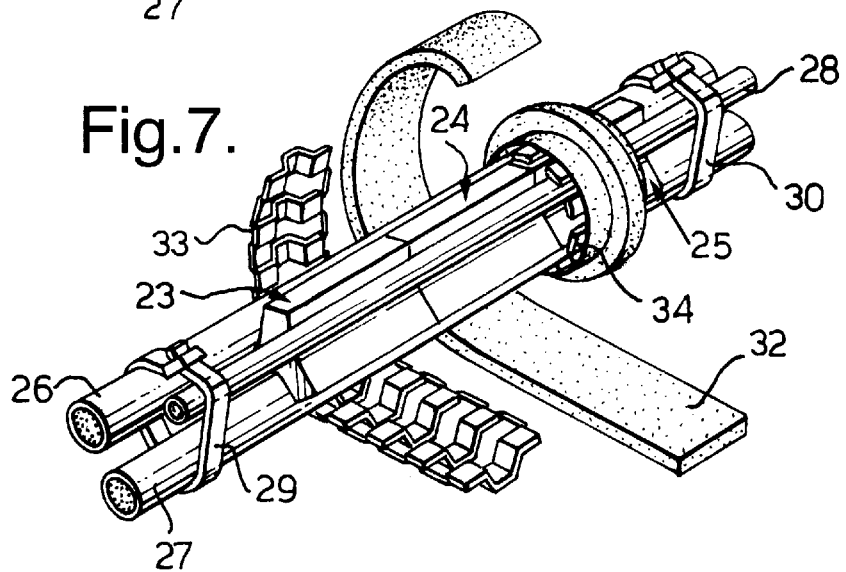
FIG. 7 is a perspective view illustrating a further step in the production of a seal assembly according to the present invention.

The radially projecting part of the ribs 19, 20, 22 which extend beyond the cables 26, 27 and the reinforcement member 28 are then removed by severing the surplus portions as illustrated in FIG. 5, following which, as illustrated in FIG. 6, the overall diameter of the assembly is determined using measuring tape 31 and, as illustrated in FIG. 7, a length of gel tape 32 sufficient to wrap several times around the gel section 24, closely fitting over cables 26, 27 and the reinforcement member 28. On either side of the gel tape 32 are fitted respective tension resistant retainers 33, 34 comprising shaped elements cut to length as determined by the measurements made by the tape 31 as illustrated in FIG. 6 so that they encircle once around the respective resilient portion 23 or 25. The tension resistant retainers 33, 34 fit firmly over the assembly comprising the resilient portion 23 or 25 and the cables 26, 27 and reinforcement member 28. A further retaining band in the form of adhesive tape (not shown) may then be positioned over the tension resistant retainers 33, 34 to hold them in place and to maintain tension.

Figure 8:
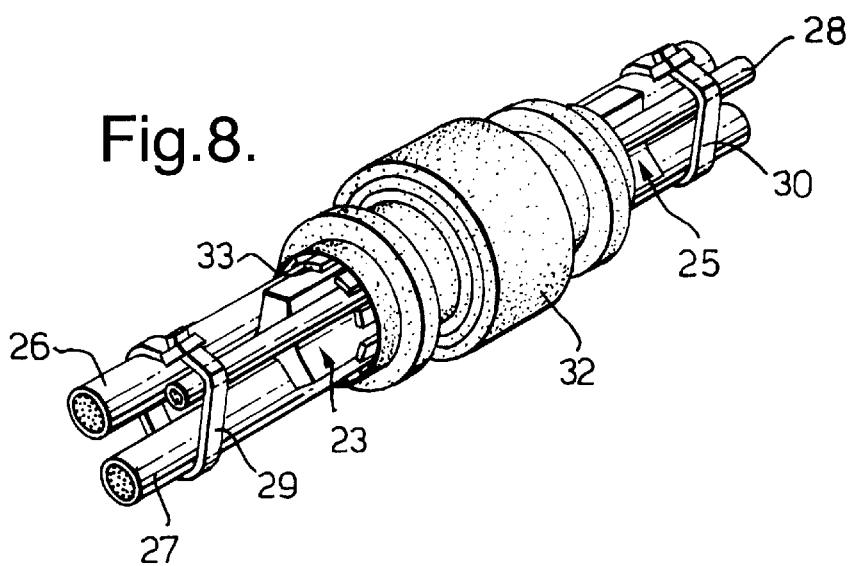
FIG. 8 is a perspective view of a completed seal assembly.

The completed assembly is illustrated in FIG. 8. This assembly is then positioned on a housing part 12b, for example, as illustrated in FIG. 1 with the gel tape 32 located in the cavity 16 and the two tension resistant retainers 33, 34 located in the recesses 14b and the axially aligned corresponding recesses 10a, 10b in the wall 15 with the gel tape 32 in contact with the edges of the cavity 16 whereby to form a secure seal entirely around the periphery of the opening to prevent the ingress of environmental agents into the interior of the casing 11 when the two shell halves 12a, 12b are fitted together.

Figure 9:
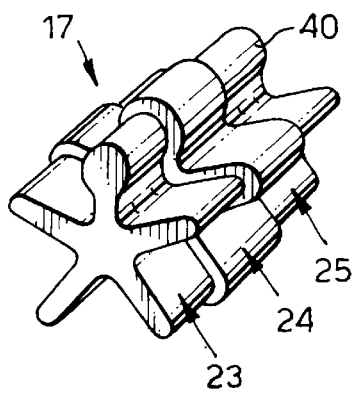
FIG. 9 is a perspective view of an alternative embodiment of a seal element of the present invention.

An alternative embodiment of the seal element 17 of the present invention is shown in FIG. 9. In this embodiment, each part 23, 24, 25 is provided with retaining bodies 40 at the ends of the rib 22. That is, rib 22 is widened, both of its radially distant end and at the center of each part 23, 24, 25, so as to form retaining bodies 40. In the embodiment shown, the retaining bodies 40 have a substantially cylindrical shape. Also, the middle part 24 projects beyond the outer parts 23, 25, having thicker ribs and bigger retaining bodies.

It is noted that in the embodiment shown in FIG. 9, all these parts 23, 24 and 25 are provided with retaining bodies 40. Although this arrangement provides an optional retaining and sealing function, it can be envisaged that only one or two of the parts are provided with retaining bodies. e.g. only the parts 23 and 25.

Figure 10A:
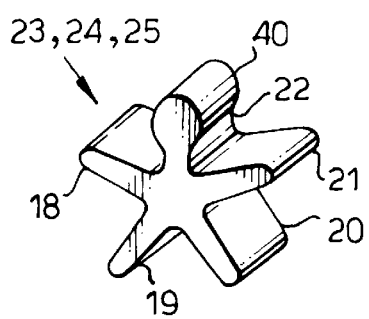
FIGS. 10a–d are perspective views showing the separation of some of the ribs from the seal element of FIG. 9.
Figure 10B:
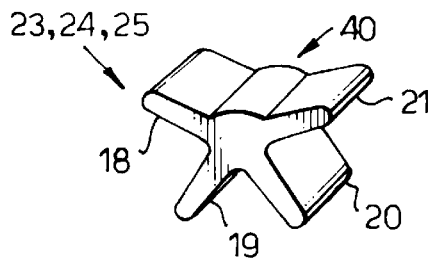
Figure 10C:
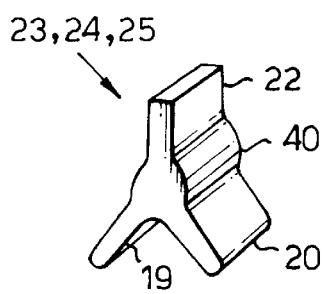
Figure 11A:
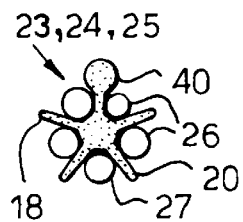
FIGS. 11a–d are top views showing various arrangements in relation to the separation shown in FIGS. 10–d.
Figure 11B:
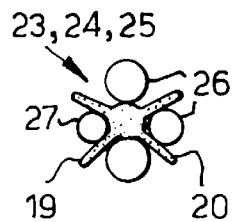
Figure 11C:
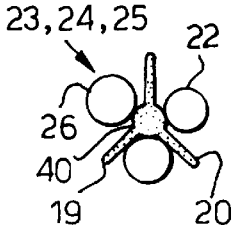

As shown in FIG. 10a in conjunction with FIG. 11a, all five ribs are used when five cables or cable groups (in general: elongate articles) 26, 27 are to be accommodated. In this case, the retaining body 40, present at the tip of one of the ribs helps to keep two of the cables 26, 27 in place.

Should four or three cables 26, 27 be accommodated, one or two of the ribs may be cut away to provide a more even distribution of the cables, as shown in FIGS. 10b & 11b, and 10c and 11c respectively. The rib 22 provided with the retaining body 40 may be cut away in this case. Also, the ribs may be shortened as desired.

Figure 10D:
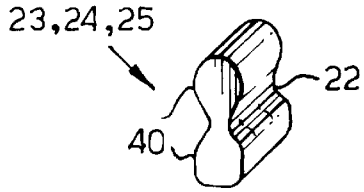
Figure 11D:
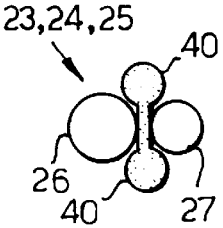

In case only two cables 26, 27 have to be accommodated, all ribs but the one provided with the retaining body are removed. Thus a single rib 22 having retaining bodies 40 at both ends remains. As can be seen from FIGS. 10d and 11d, the retaining bodies 40 serve to retain the cables 26, 27 and to better fit the combination of the cables and the resulting part 23, 24 or 25 in any closure port (not shown) or other opening.

A non-sealing part as shown in FIG. 10a can be sold separately as a cable divider. Instead of five ribs, a different number of ribs may be provided, for example, four, six or seven ribs.

The seal element of the invention, and the corresponding method of using it this provides a versatile and adaptable sealing system for accommodating different numbers of cables within a singles opening whilst nevertheless providing a secure seal independent of the number of cables, which can be produced quickly and easily and have a high degree of reliability.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A seal element for a closure having an opening through which more than one elongate article may project, the seal element comprising a body having a plurality of axially extending radially projecting ribs defining, between circumferentially adjacent pairs thereof, locations for receiving one or more said elongate articles the body comprising longitudinally adjacent parts of resilient material and sealant material.

2. A seal element as claimed in claim 1, wherein the ribs have opposite faces which are substantially parallel, the resilient material part thereof being substantially flush with the sealant material part.

3. A seal element as claimed in claim 1 wherein the ribs have opposite faces which are substantially flat.

4. A seal element as claimed in claim 3, wherein the opposite faces of the ribs converge radially outwardly.

5. A seal element as claimed in claim 1, wherein the sealant material part of the body comprises a gel.

6. A seal element as claimed in claim 1, wherein the resilient material parts of the body comprise a natural or synthetic elastomer.

7. A seal element as claimed in claim 1, wherein the plurality of radially projecting ribs comprise five radially projecting ribs.

8. A seal element as claimed in claim 1, wherein the material of both the resilient part and the sealant part can be severed with a cutting instrument.

9. A seal element as claimed in claim 1, wherein one of the ribs of at least one resilient material part or sealant material thereof is at both ends thereof provided with axially extending retaining bodies for retaining the elongate articles in their respective locations.

10. A seal element as claimed in claim 9, wherein the retaining bodies have a diameter which is at least twice the thickness of the one of the ribs.

11. A seal element as claimed in claim 9 wherein the retaining bodies have a substantially cylindrical shape.

12. An assembly for making a seal between an opening through which one or more elongate articles may project, and the articles themselves, the assembly comprising a seal element comprising a body having a plurality of axially extending radially projecting ribs defining, between circumferentially adjacent pairs thereof, locations for receiving one or more said elongate articles the body comprising longitudinally adjacent parts of resilient material and sealant material, at least one retainer or tie strap for retaining the elongate articles in position between respective pairs of ribs, and an elongate strip of sealant material configured to be wrapped around the elongate articles at an axial location corresponding to the sealant material part.

13. An assembly as claimed in claim 12, wherein at least one of the elongate articles comprises a substantially rigid reinforcing member positionable alongside another of the elongate articles or between two adjacent ones of the ribs without another of the elongate articles therebetween.

14. An assembly as claimed in claim 12 wherein the at least one retainer or tie strap comprises a plurality of retainers or tie straps for encircling the elongate articles at a position axially spaced from the body of the seal element at each end thereof.

15. An assembly as claimed in claim 12, further including an adhesive strip for encircling the sealant strip and retaining it in position around the elongate articles and the body of the seal element.

16. An assembly as claimed in claim 12, further including at least one tension resistant retainer configured to be fitted so as to extend circumferentially around the elongate articles and the resilient material part of the seal element and to hold them together whereby to transfer axial loads from one to the other.

17. An assembly as claimed in claim 16, wherein the tension resistant retainer comprises a strip of malleable material having surface formations such as to grip the resilient part of the seal element when located circumferentially thereabout.

18. A method of forming a seal for sealing between an opening and elongate elements passing through the opening, the method comprising the steps of:

assembling the elongate elements with a seal element comprising a body having a plurality of axially extending radially projecting ribs defining, between circumferentially adjacent pairs thereof, locations for receiving one or more said elongate elements the body comprising longitudinally adjacent parts of resilient material and sealant material with each elongate element received in a respective location between two adjacent elongate ribs of the seal element and extending there along;

encircling the elongate elements with a retainer to secure them in position in the respective locations;

severing that part of each rib projecting radially beyond the elongate elements; and applying an elongate strip of sealant circumferentially around the seal element in axial juxtaposition with the sealant material part of the body to form a surrounding band of sealant having dimensions which are not less than those of he opening to be sealed.

19. A method of forming a seal as claimed in claim 18, wherein the seal element is prepared by removing one or more of the ribs to provide a number of locations appropriate for the number of elongate elements to be received in the respective locations thereof.

20. A method of forming a seal as claimed in claim 18, further comprising a supplementary member configured to be received in a location not required for an elongate member, around which the retainer member passes to retain the elongate elements in position in the locations.

21. A method of forming a seal as claimed in claim 18, further comprising wrapping a further tension resistant retainer circumferentially around the elongate elements and the seal element in axial register with the resilient material part of the body.

22. A seal element for use with a closure having an opening configured to receive a plurality of elongate articles, the seal element comprising:

a first body part comprised of a resilient material and having a plurality of axially extending radially projecting ribs extending therefrom;

a second body part located longitudinally adjacent the first body part, the second body part being comprised of a sealant material and having a plurality of axially extending radially projecting ribs extending therefrom; and wherein the ribs of the first body part and the ribs of the second body part are respectively aligned to define between circumferentially adjacent pairs of the ribs of each of the body parts longitudinally extending locations for receiving at least one of the plurality of elongate articles.

23. The seal element of claim 22 further comprising a third body part located adjacent the second body part on a side opposite the first body part, the third body part being comprised of a resilient material and having a plurality of axially extending radially projecting ribs extending therefrom and wherein the ribs of the third body part are respectively aligned with the ribs of the first body part and the second body part to define between circumferentially adjacent pairs of the ribs of each of the body parts the longitudinally extending locations.

24. The seal element of claim 23 wherein the ribs of the body parts have substantially parallel opposite faces.

25. The seal element of claim 24 wherein the opposite faces are substantially flat.

26. The seal element of claim 23 wherein the sealant material comprises a gel.

27. The seal element of claim 26 wherein the resilient material comprises a natural or synthetic elastomer.

28. The seal element of claim 23 wherein the ribs of at least one of the body parts further comprises axially extending retaining bodies at ends thereof positioned to retain the elongate articles in respective ones of the longitudinally extending locations.

29. The seal element of claim 28 wherein the retaining bodies have a diameter of at least twice a thickness of the ribs of the at least one of the body parts.

30. The seal element of claim 28 wherein the retaining bodies have a substantially cylindrical configuration.

31. A seal assembly for use with a closure having an opening configured to receive a plurality of elongate articles, the seal assembly comprising:

a seal element comprising:
a first body part comprised of a resilient material and having a plurality of axially extending radially projecting ribs extending therefrom;
a second body part located longitudinally adjacent the first body part, the second body part being comprised of a sealant material and having a plurality of axially extending radially projecting ribs extending therefrom; and
wherein the ribs of the first body part and the ribs of the second body part are respectively aligned to define between circumferentially adjacent pairs of the ribs of each of the body parts longitudinally extending locations for receiving at least one of the plurality of elongate articles;
a retainer that connects the elongate articles to the seal element in respective ones of the longitudinally extending locations; and a layer of sealant material positioned around the seal element adjacent the second body part.

32. The seal assembly of claim 31 wherein the retainer comprises two retainers, one of which encircle the elongate articles at a position longitudinally spaced from the body parts at each end of the seal assembly.

33. A closure for receiving a plurality of elongate articles, the closure comprising:

an opening at an end thereof configured to receive the plurality of elongate articles;
a seal assembly positioned in the opening, the seal assembly comprising:
a seal element comprising:
a first body part comprised of a resilient material and having a plurality of axially extending radially projecting ribs extending therefrom;
a second body part located longitudinally adjacent the first body part, the second body part being comprised of a sealant material and having a plurality of axially extending radially projecting ribs extending therefrom; and
wherein the ribs of the first body part and the ribs of the second body part are respectively aligned to define between circumferentially adjacent pairs of the ribs of each of the body parts longitudinally extending locations for receiving at least one of the plurality of elongate articles;
a retainer that connects the elongate articles to the seal element in respective ones of the longitudinally extending locations; and
a layer of sealant material positioned around the seal element adjacent the second body part.

* * * * *